US008485410B1

(12) United States Patent
Harshman

(10) Patent No.: US 8,485,410 B1
(45) Date of Patent: Jul. 16, 2013

(54) NAIL GUN MAGAZINE FOR STACKED FASTENERS

(75) Inventor: Bruce Harshman, Mt. Zion, IL (US)

(73) Assignee: High Wind Products, Inc., Missouri, MO (US)

( * ) Notice: Subject to any disclaimer, the term of this patent is extended or adjusted under 35 U.S.C. 154(b) by 325 days.

(21) Appl. No.: 12/584,281

(22) Filed: Sep. 2, 2009

Related U.S. Application Data

(60) Provisional application No. 61/190,706, filed on Sep. 2, 2008.

(51) Int. Cl.
*F16B 15/08* (2006.01)

(52) U.S. Cl.
USPC .............................. 227/120; 227/148; 411/442

(58) Field of Classification Search
USPC .................. 227/120, 148, 119, 225; 411/442, 411/443
See application file for complete search history.

(56) References Cited

U.S. PATENT DOCUMENTS

| | | | | |
|---|---|---|---|---|
| 2,994,878 | A * | 8/1961 | Abrahamsen | 227/134 |
| 4,089,099 | A | 5/1978 | Nivet | 29/811.2 |
| 4,136,810 | A * | 1/1979 | Bull | 227/120 |
| 4,196,836 | A | 4/1980 | Becht | 227/110 |
| 4,204,625 | A | 5/1980 | Glenn | 227/76 |
| 4,403,722 | A | 9/1983 | Nikolich | 227/8 |
| 4,483,280 | A | 11/1984 | Nikolich | 123/46 SC |
| 4,483,473 | A | 11/1984 | Wagdy | 227/8 |
| 4,483,474 | A | 11/1984 | Nikolich | 227/8 |
| 4,522,162 | A | 6/1985 | Nikolich | 123/46 SC |
| 4,585,154 | A | 4/1986 | Fealey et al. | 227/109 |
| 4,815,910 | A * | 3/1989 | Potucek | 411/444 |
| 4,858,812 | A | 8/1989 | Fealey | 227/116 |
| 5,000,365 | A | 3/1991 | Fealey | 227/130 |
| 5,192,012 | A * | 3/1993 | Schafer et al. | 227/113 |
| 5,199,625 | A | 4/1993 | Dewey et al. | 227/8 |
| 5,238,167 | A | 8/1993 | Howard et al. | 227/110 |
| 5,263,439 | A | 11/1993 | Doherty et al. | 123/46 SC |
| 5,664,722 | A | 9/1997 | Marks | 227/132 |
| 5,927,922 | A | 7/1999 | Miller | 411/444 |
| 5,979,735 | A | 11/1999 | Olvera et al. | 227/119 |
| 6,010,291 | A * | 1/2000 | Schwingle | 411/442 |
| 6,131,787 | A * | 10/2000 | Curtis | 227/120 |
| 6,422,447 | B1 * | 7/2002 | White et al. | 227/120 |
| 6,443,348 | B2 * | 9/2002 | Lamb | 227/8 |
| 7,090,455 | B2 | 8/2006 | Lamb | 411/531 |
| 7,228,998 | B1 | 6/2007 | Schulz et al. | 227/147 |
| 2006/0102683 | A1 * | 5/2006 | Schnell et al. | 227/119 |
| 2007/0114259 | A1 * | 5/2007 | Bromley et al. | 227/120 |
| 2008/0260496 | A1 * | 10/2008 | Parmann | 411/439 |

OTHER PUBLICATIONS

D.C. Greenwood. *Engineering Data for Product Design.* (McGraw-Hill: New York 1961).

(Continued)

*Primary Examiner* — M. Alexandra Elve
*Assistant Examiner* — Eyamindae Jallow
(74) *Attorney, Agent, or Firm* — Jonathan A. Bay

(57) ABSTRACT

A magazine for a stack of fasteners in which the mean surface area overlap between adjacent fastener heads is substantial, has a chute, a constantly-urged follower pushing the stack in the chute, a slideway that intersects the chute at a separation station for the lead fastener, and a slide for pushing the lead fastener to an expulsion station and then retracting to get behind the next fastener to dispense from the chute and accede to the separation station, it being the new lead fastener.

17 Claims, 12 Drawing Sheets

OTHER PUBLICATIONS

Section entitled "10 ways to change straight-line direction," pp. 324-327.

Paslode 18 Gauge Cordless Finish Nailer: Operating Manual © 2001 Illinois Tool Works. Inc.

Paslode Cordless 18 Gauge Brad Nailer: Tool Schematic and Parts © 2006 Illinois Tool Works. Inc.

* cited by examiner

NAIL GUN MAGAZINE FOR STACKED FASTENERS

CROSS-REFERENCE TO PROVISIONAL APPLICATION(S)

This application claims the benefit of U.S. Provisional Application No. 61/190,706, filed Sep. 2, 2008, the disclosure of which is incorporated fully herein by this reference thereto.

BACKGROUND AND SUMMARY OF THE INVENTION

The invention generally relates to magazines for nail guns and, more particularly, to a combination magazine and loader for supplying, separating and loading the leading member from a supply of fasteners or tacks of the type characterized by commonly-owned U.S. Pat. No. 5,927,922, entitled "Tack, Hammer Tacker Therefor, and Method," as well as commonly-owned U.S. Pat. No. 7,228,998, entitled "Hammer Tacker, and Tack Therefor," the disclosures of which are incorporated fully herein by this reference.

Briefly, the tack disclosed in those patents has an especially broad flat head to provide a large surface area particularly effective for fastening soft, thin, membrane materials.

It is an object of the present invention to provide consumers of this tack with a magazine option other than the known manual hammer tacker magazines as disclosed in the commonly-owned patents, and in favor of manual, electric, pneumatic, or gas-powered nail guns outfitted with a magazine in accordance with the invention.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
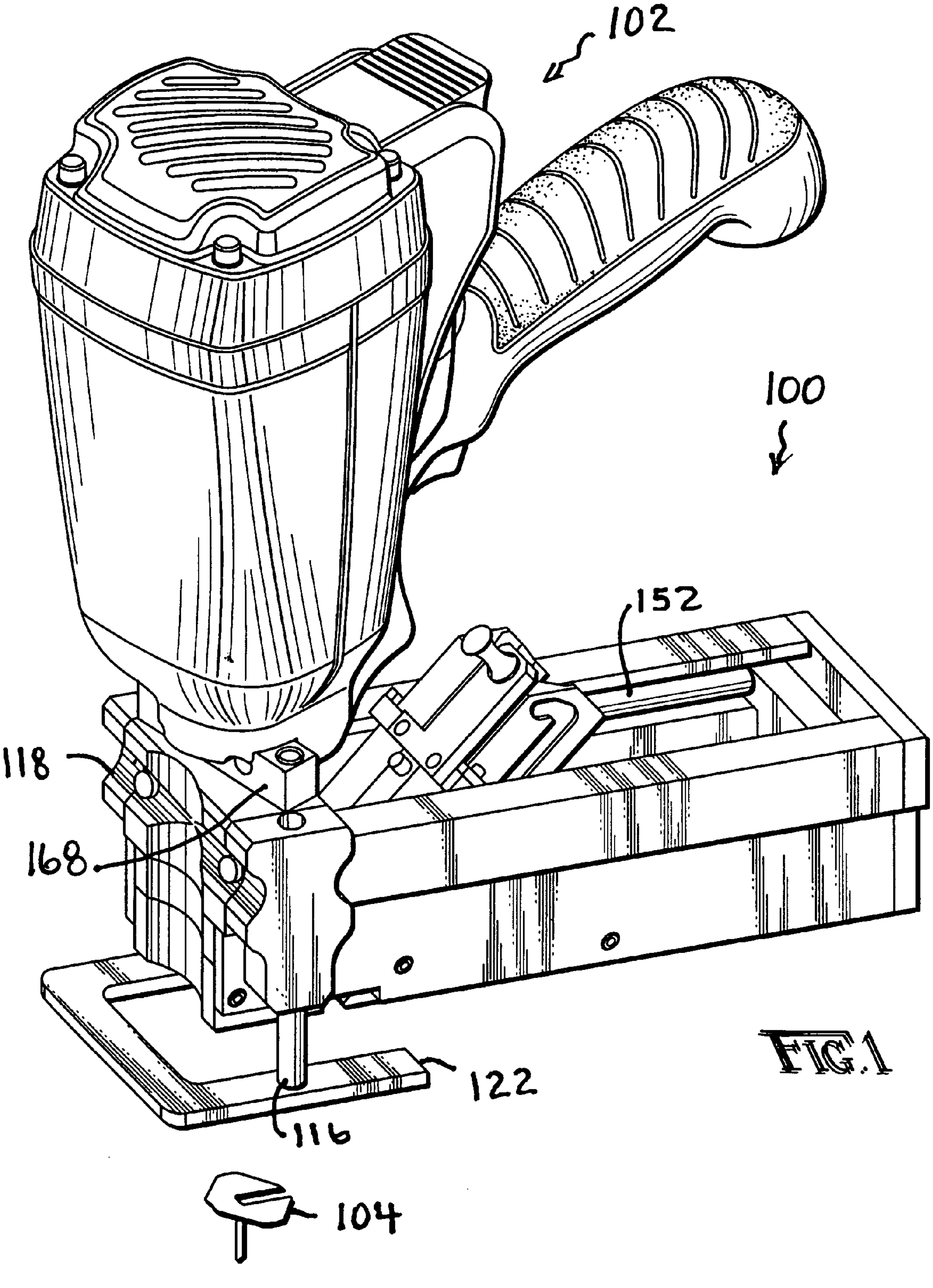
FIG. 1 is a perspective view of a cordless nail gun in accordance with the prior art equipped with a nail gun magazine in accordance the invention that accepts a supply of fasteners arranged in a stack, wherein one non-limiting example of such a tack is shown in isolation below the discharge end.

FIG. 1 shows a nail gun magazine 100 in accordance the invention removably (but firmly) attached to a cordless nail gun 102 in accordance with the prior art.

The nail gun magazine 100 accepts a supply of fasteners 104 arranged in a stack 106 (see, eg., FIGS. 3 and 4), wherein one non-limiting example of such fasteners is a tack 104 is shown in isolation below the discharge end.

An example use of the combination magazine 100 in accordance with the invention and nail gun 102 of the prior art includes, without limitation, roofing jobs. A roofer might tack a row of shingles with such fasteners or "tacks." Other example uses include without limitation drying in a roof with felt, or applying a house wrap (ie., a vapor barrier) for exterior walls or also hanging dry wall or sheetrock for interior walls, and so on.

This representative, and non-limiting, example of a prior art nail gun 102 comprises a modified PASLODE® 18 Gauge Cordless Finish Nailer (Part No. 901000), a product of Illinois Tool Works, Inc.

Again, the nail gun 102 was modified, and the modifications include the following. The stock magazine (not shown) of the PASLODE® nail gun 102 has been removed. The stock magazine was designed to be loaded with and feed 18 gauge brad nails (eg., finish nails, and not shown) in lengths from 5/8ths-inch to two inches long (~1 5/8 to five cm long).

Finish nails are the opposite of tacks. Finish nails are thin, slender fasteners, with especially tiny heads. The head diameter might not even be twice the shank diameter. The stock magazine stood these nails straight up, and fed them straight in: —in other words, the conveyance of these nails in the stock magazine was the opposite of being stacked.

That is, if a straight stack is envisioned as being a vertical column, then in contrast the conveyance of the nails in the stock magazine was in a horizontal row. For this and other reasons, the stock magazine of the PASLODE® nail gun 102 would offer no opportunity for modification for the conveyance of tacks 104 in a stack 106, as here. Hence it was dispensed with altogether.

Also modified was the handle of the PASLODE® nail gun 102 (hereinafter, simply "nail gun 102," except where context means other brands and types too). The nail gun 102's handle as shown in the drawings is a truncated, lopped off version of the stock design. In fact, much of the lopped off part of the handle comprised not only a transition into the stock magazine but also a battery pack (it too is not shown). The battery pack has been retained, except that it has been separated from the stock magazine—which was dispensed with—and was remounted on the side of the nail gun 102 (but this is not shown).

Moreover, the stock safety trip (or work-contacting element) has been removed. Needless to say, the stock safety trip was a safety device. It looked like and had a (former) location of what might be envisioned as a stubby, pistol barrel. The stock safety trip was where the nail was shot out of the stock magazine. As a matter of safety, the PASLODE® nail gun 102 does not fire unless the safety trip was placed against the work, and then pressed into it. The safety trip would not pierce the work but, instead, it depressed into the nail gun 102, pushing an elongated linkage back into the body of the nail gun 102, to switch ON an electric circuit. The switch tripped a series of events to transpire. A fan motor started to blow air (hence the need for a substantial battery pack) as injectors would inject fuel in the air stream to charge a combustion chamber. Only then would squeezing the trigger ignite the fuel/air mixture in the combustion chamber. That in turn would blast the piston down on the nail, hence driving the nail.

The safety trip had another function after that. After use, the user would lift the nail gun 102, and the safety trip would restore itself to its original non-depressed state. This would cause the combustion chamber to open, the fan was allowed to continue to run for a time, so as to exhaust the hot gases and cool internal components. Nonetheless, the stock safety trip (or work-contacting element) was removed.

This PASLODE® nail gun 102 is typical of a category of mechanized nail guns, a category more generally known as impulse hammers. These are gas-powered nail guns that detonate combustible fuel in an internal-combustion piston chamber (piston chamber not shown but, for a piston, indicated by reference numeral 108, see FIGS. 7 through 13).

Whereas the nail gun magazine 100 in accordance with the invention is inventive in connection with stacked fasteners, it can be readily adapted for use with other types of mechanized nail guns and/or driving tools. Thus, it is an object of the present invention to provide consumers of this tack with a magazine option other than the known manual hammer tacker magazines as disclosed in the commonly-owned patents, and in favor of manual, electric, pneumatic, or gas-powered nail guns outfitted with the magazine 100 in accordance with the invention. It is merely a design preference to illustrate the inventive nail gun magazine 100 with a gas-powered (cordless) impulse nail gun because such is truly a deluxe, high end tool in the industry.

Figure 2:
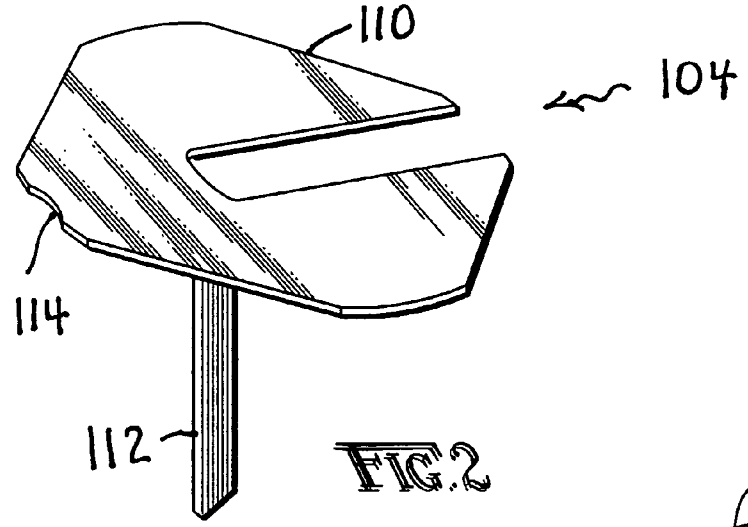
FIG. 2 is an enlarged scale perspective view of the tack shown in FIG. 1.

FIG. 2 shows a representative broad-headed tack 104 for service in the nail gun magazine 100 in accordance with the invention. It is a distinguishing aspect of the tack 104 that it has a relatively broad flat head 110. This provides a larger surface area to secure relatively fragile sheet or membrane materials that might readily rip-out from under the diminutive retention surfaces of, say, common nail heads, or staples. Example applications include without limitation, laying roof shingles or drying in a roof with felt, applying a house wrap (ie., the vapor barrier) or sheeting materials for exterior walls, as well as hanging dry wall or sheetrock for interior walls.

The tack 104 is preferably produced from relatively light gauge sheet metal. A preferred embodiment of the tack 104 has a head 110 measuring one inch (twenty-five mm) square. The head 110 is bounded by four straight edges and four rounded corners. The tack 104 has a shank 112 extending down from the head 110 that is between about three-fourths an inch (nineteen mm) and seven-eighths an inch (twenty-two mm) long. The preferred gauge for the parent sheet metal might be between twenty and twenty-four gauge, although other sizes can be equally adapted for the purpose, to make larger or smaller—or stiffer or whatever—tacks 104 as desired.

The shank 112 of the tack 104 is lanced out of the tack head 110. The shank 112 has a rounded-V cross-section to improve stiffness, and is pointed at the end to improve piercing. The consequence of lancing the shank 112 out of the head 110 is, to leave behind a slot in the head 110 of the tack 104, which originates at about the head 110's center, and extends out through an open end in one corner.

Figure 3:
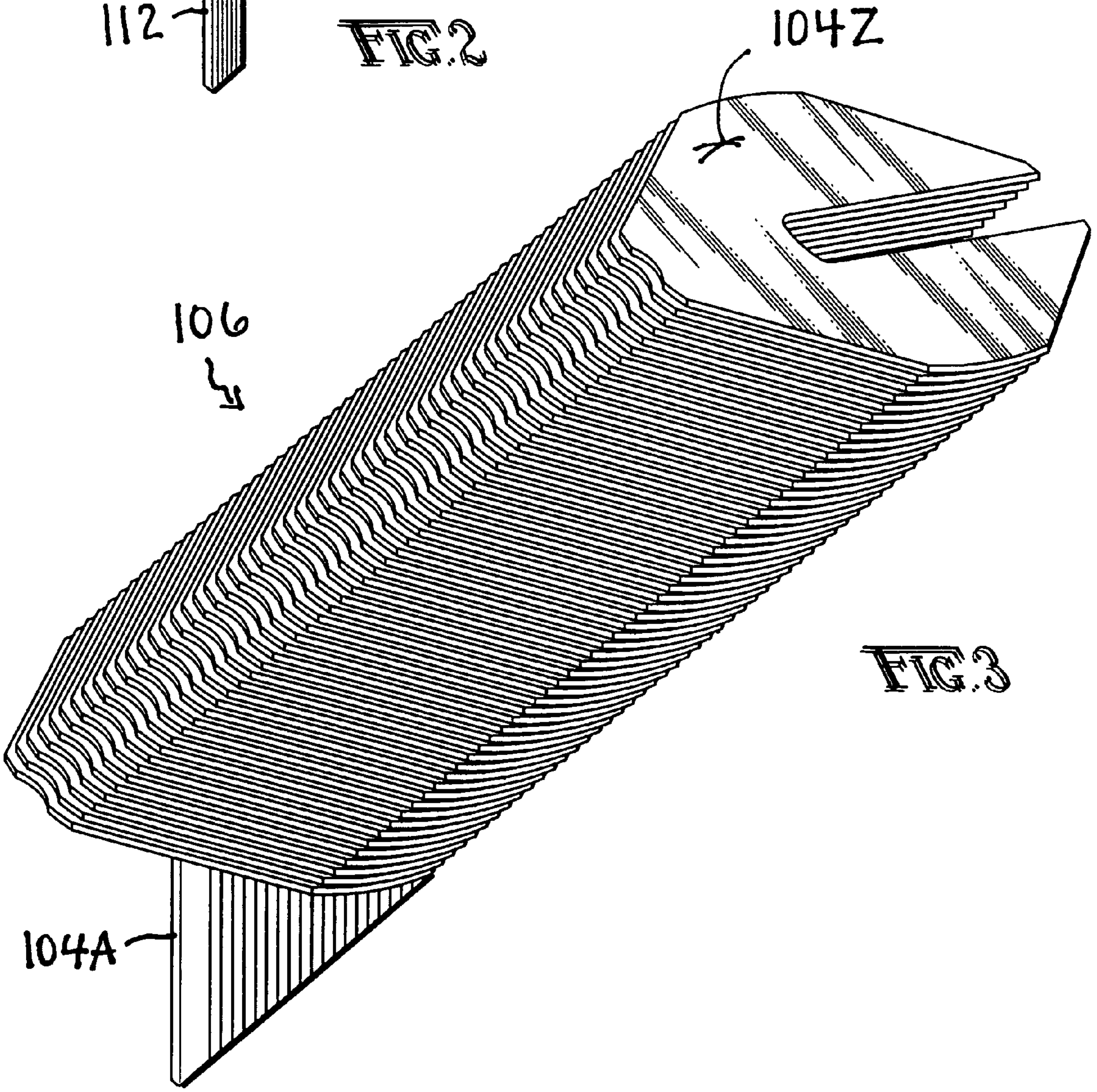
FIG. 3 is a perspective view comparable to FIG. 2 except showing a plurality of such tacks interlocked with one another in a nearly vertical stack.

FIG. 3 together with FIG. 2 shows that the slot in the tack head 110 of one tack 104 allows the shank 112 of another like tack 104 to insert therein for stacking in a pitched stack 106 as shown. The tack 104A at the bottom of the stack 106 is the lead tack (ie., it is the member of the stack 106 that is first separated from the stack 106 and driven by the nail gun 102). The tack 104Z at the top is the trailing-most tack in the stack 106.

It is preferred that the tacks 104 are advanced in the plane of their heads 110. It is furthermore preferred if the leading part of the tack head 110 is one of the corners. That is, for each tack head 110, the leading corner is the one opposite the corner with the slot-opening. Each tack head 110 has a notch 114 in its leading corner. Each tack 104 is inserted on top of the stack having its head 110 flush against the head 110 of the tack 104 below it, and its shank 112 nested flush in the slot and against the shank 112 of the tack 104 below it.

The lead tack 104A adheres to the bottom of the stack 106 by virtue of numerous shanks 112 (see also FIG. 4) of tacks 104 immediately above it binding in its slot. Indeed, the slot of the lead tack 104A is filled to its entirety with those fifteen shanks 112 of the first fifteen tacks 104 immediately above it (again, see also FIG. 4). This is so for every other tack 104 in the stack 106, except the top fifteen. The tack second from the top only has the shank 112 of the top tack 104Z sticking through its slot. The top tack 104Z has none at all. Nevertheless, the top tack 104Z adheres to the stack 106 by having its shank 112 pinched in the slot of its fifteen predecessors (the first fifteen tacks 104 below it). Indeed once more, the shank 112 of every tack 104 in the stack 106 is pinched in the slots of the first fifteen tacks below it, except the bottom fifteen. The tack second from the bottom only has its shank 112 pinched in the slot of the bottom (lead) tack 104A. The shank 112 of the lead tack 104A is pinched in none and hence, and importantly, it is not obstructed for travel in the preferred leading direction (ie., the plane of its head 110). Once more, the lead tack 104A adheres to the stack 106 by what was described at the beginning of this paragraph.

Figure 4:
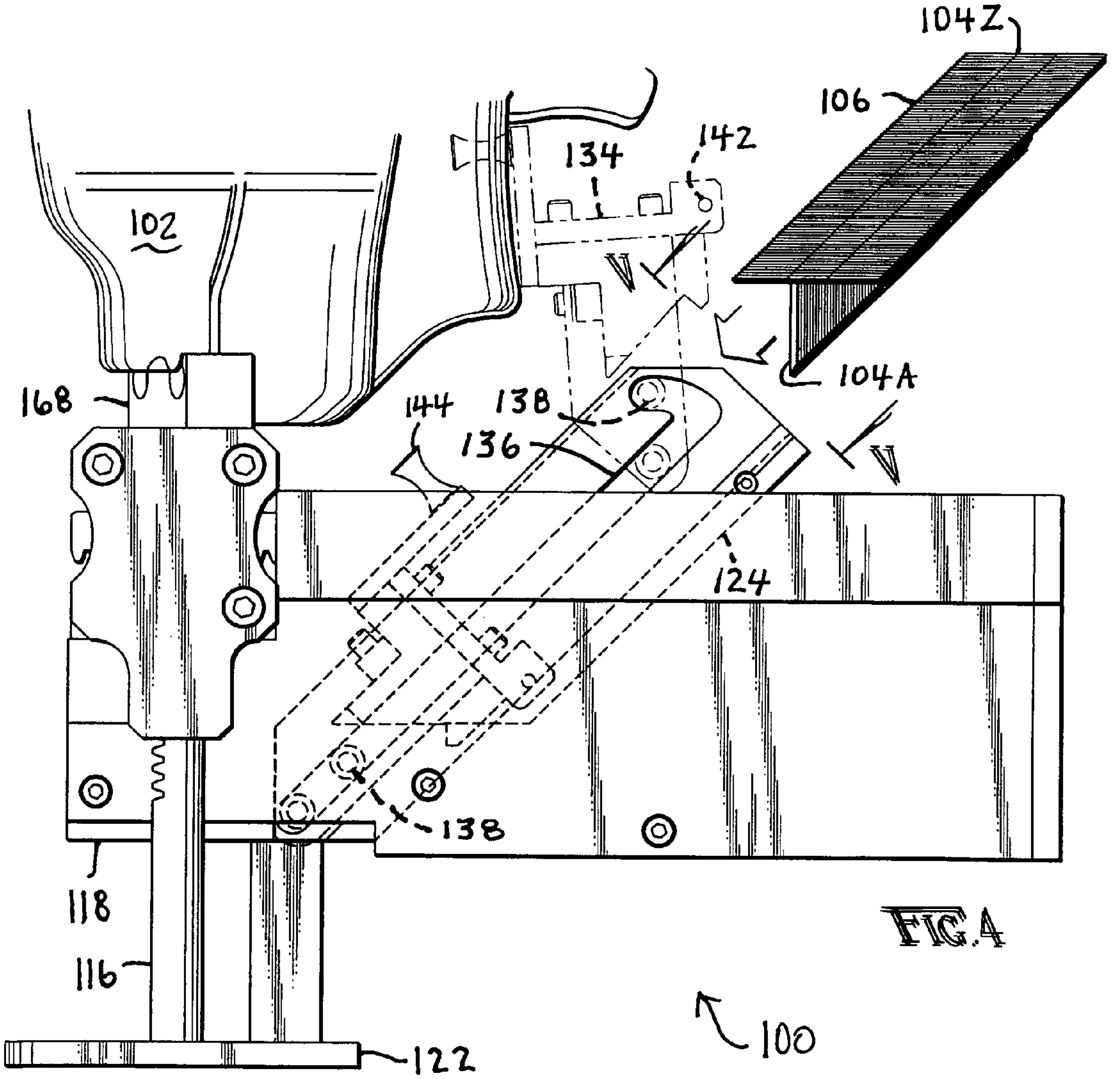
FIG. 4 is an enlarged-scale side elevational view of FIG. 1, with portions broken away, and, with the follower shown in two positions, once in substantially hidden lines and the other in dashed lines to show the manner of retracting the follower and loading the magazine with a stack of tacks that will be constantly-urged at the trailing end by the follower.

It will be noted in FIGS. 3 and 4 that, the stack 106 rises not at a 90° angle characteristic of a true straight (vertical) column, but at a 45° pitch. Nevertheless, the stack 106 is a densely packed mass of tacks 104, albeit at a 45° pitch.

In other words, the tacks 104 stack up not in a straight (vertical) column but at an angle, where each tack head 110 is axially (laterally) offset from the previous by the thickness of a tack shank 112 (plus any gap between shanks 112 if there were any, but preferably there is not). The center of geometries of all the tacks 104 define an axis for the stack 106. The rise of this axis leans over the base plane (eg., the horizontal) by the amount of axial offset between one tack 104 to the next. Like a staircase has a pitch (angle), this stack 106 has a characteristic pitch. For this stack 106, that pitch is 45°. That is, between each tack 104 and the next, the stack 106 has a pitch equal to the arctangent of the ratio of the thickness of a tack head 110 (eg., the opposite side of a right triangle) to the lateral offset due to a tack shank 112 (eg., the adjacent side). Since the tack heads and shanks 110 and 112 are products of the same sheet gauge, then their thicknesses are the same. Hence if the tacks 104 are nested ideally with no gaps between adjacent tack heads 110 and adjacent tack shanks 112, the pitch of the stack 106 is optimally the arctangent of a 1:1 incremental ratio from each tack 104 to the next, hence yielding a 45° pitch for the stack 106.

It is an aspect of the invention that the stack 106 for the magazine 100 is a highly dense mass of tacks 104. The stack density can probably be specified by numerous criteria, but two are offered here. One is, the number of tacks 104 per unit height. The other is, the percentage of surface area overlap between tack heads 110 of adjacent tacks 104 in the stack 106. For example, if two equal coins were stacked perfectly one on top the other (ie., there is no axial offset), then there would be one-hundred percent surface area overlap. But if their centers were axially offset by some amount less their common diameter (by any more than that and they would not overlap at all), there would be something less than one-hundred percent surface area overlap.

Surface area overlap can be computed from axial offset, as will be set forth below. However, for circles, the equation is a little unwieldy. Nevertheless, for small values of axial offset, there is an approximation which applies to both squares and circles, and again as will be more particularly described below.

Giving real numbers to these criteria yields the following. In consideration of number of tacks 104 per unit height, an estimate might be calculated. The unit height might be chosen to be tack head 110 diameter. Although it's not really one inch for tack heads 110, for convenience here it is assumed to be one inch. That way, the number of tacks 104 per inch would be the inverse of the thickness of one tack head 110, when given in inches. For example, consider a stack 106 of tacks 104 produced out of twenty-two gauge sheet metal (not stainless, aluminum, galvanized or other exotics, just plain steel). Twenty-two gauge sheet metal has a nominal thickness of 0.0299 inches (0.7595 mm). The inverse of 0.0299 yields a calculated value of thirty-three tack 104 heads per inch of stack height. On the other hand, counting out an inch's worth of real tacks 104 stacked together obtained a count of thirty tacks 104 per inch of stack height. Nevertheless, the manually-counted value with real twenty-two gauge tacks agrees fairly well with the calculated value.

The second criterion for specifying stack density is surface area overlap (either fractional or percentage) of adjacent tack heads 110. As a preliminary matter, the tack head 110 of tack 104 (and as better shown in FIG. 2) is neither a complete square nor a complete circle, but some of both. In the calculations below, the tack head 110 is analyzed alternately as a square and then a circle, but in both instances the slot 112 is ignored, and treated as solid material.

With squares being first, the tack heads 110 can be likened to thin square tiles (and solid ones, eg., the slots 112 are considered filled with solid material). The surface area overlap percentage of two square tiles stacked with their centers axially offset from each other is not only a function of axial offset between their respective centers (ie., the lateral distance the center of one is slid horizontally away from the other) but also a function of the vector of the offset. If two square tiles are tiled on top of each perfectly, then there is no axial offset (ie., the centers line right up on top of each other), and then there is also one hundred percent overlap.

Only two vectors of axial offset will be considered. One vector is when the center of one tile is offset relative to the center of the other along a bisect line parallel between two opposite sides. More simply, envision the two panes of a sliding glass door. Their relative displacement of their centers is back and forth on this one vector. The other vector is when the center of one tile is offset relative to the center of the other along a diagonal of each. This is how the tack heads 110 of stack 106 are axially offset.

So for the first vector of axial offset (eg., relative displacement between the two panes of a sliding glass door), envision the two equal square tiles held in parallel planes by tracks along their top and bottom edges. 'Fractional' axial offset "δ" shall be defined as the transverse displacement between centers as a ratio of side length.

$$\text{Axial offset}=\delta=[(\text{offset distance between centers})/(\text{side length})]. \quad (1)$$

Surface area overlap of the two tiles varies directly with one minus the axial offset.

$$\text{Fractional surface area overlap}=1-\delta. \quad (2)$$

That is, if two tiles one-inch square are tiled such that their centers are a half-inch apart when slid in parallel planes by tracks along their top and bottom edges, then the 'fractional' axial offset is one half, and the 'fractional' surface area overlap is one half.

For the second vector, envision the two square tiles being slid relative each other on their diagonals. 'Fractional' axial offset "δ" in this case is modified to be defined as the transverse displacement between centers as a ratio of diagonal length.

$$\text{Axial offset}=\delta=[(\text{offset distance between centers})/(\text{diagonal length})]. \quad (3)$$

Surface area overlap of the two tiles varies directly with the square of, one minus the axial offset.

$$\text{Fractional surface area overlap}=(1-\delta)^2. \quad (4)$$

That is, if two square tiles are tiled such that their centers are a half of a diagonal apart when slid along mutually overlapping diagonals, then the 'fractional' axial offset is one half, and the 'fractional' surface area overlap is one quarter. And so on, if 'fractional' axial offset is one-quarter, then the 'fractional' surface area overlap is nine-sixteenths.

Now to turn to the case of circles. Instead of tiles, the tack heads 110 can be likened to solid coins. There is only one characteristic vector of relative displacement for coins. They are always offset along mutually overlapping diameters. 'Fractional' axial offset "δ" for circles shall be defined as the transverse displacement between centers as a ratio of diameter.

$$\text{Axial offset}=\delta=[(\text{offset distance between centers})/(\text{diameter})]. \quad (5)$$

Surface area overlap for two coins varies according to equation (6).

$$\text{Fractional surface area overlap} = \frac{2}{\pi}\left\{\left\{\pi\left[\frac{2\cos^{-1}(\delta)}{360}\right]\right\} - \{\delta * \sin[\cos^{-1}(\delta)]\}\right\} \quad (6)$$

Table 1 below gives some sample calculations for surface area overlap percentage between two coins according to a range of 'fractional' axial offsets. To be clear, when two coins are stacked according to axial offset "δ" equal to one-half, that means that the centers of both coins coincide with some point on the circumference of the other.

TABLE 1

| axial offset, δ | fractional overlap (percentage overlap) |
|---|---|
| ½ | 0.39 (39%) |
| ⅓ | 0.583 . . . (58.4%) |
| ¼ | 0.685 (68½%) |
| 0.10 | 0.87 (87%) |
| 0.05 | 0.936 (93.6%) |
| 0.02 | 0.975 (97½%) |

All of the foregoing boils down to a remarkably simple proportion. When the axial offset δ is fairly small (eg., fractional axial offset δ is about 0.05 and less), then surface area overlap can be approximated as follows—and not only for the two vectors of relative displacement between squares as discussed above, but also for circles: —

$$\text{Fractional surface area overlap} \doteq 1\delta.$$

$$\text{(For } \delta \text{ generally less than 0.05).} \quad (7)$$

As more particularly described above, the tack head 110 is formed from the outline of a square that measures one inch (25.4 mm) on the sides. The diameter across the truncated diagonal line transverse to the slot (eg., extending between the two opposite rounded corners) measures about one-and-three-sixteenths of an inch (˜30 mm). Hence this tack head 110 would have a simulated diameter somewhere between those two values. For convenience sake, the lower value (one inch or 25.4 mm) is adopted.

The same that was described about the count of tacks 104 per inch of stack 106 is true about tack head 110 axial offset per inch. Manually counting out an inch's worth of real tack heads 110 axial offset in the stack gives the same count of thirty tack heads 110 per inch of stack transverse displacement. Again, recall that the pitch of the stack is 45°. So fractional axial offset 8 is equal to the offset distance between centers of adjacent tack heads 11 normalized by division of the nominal diameter, which is chosen here to be one inch (25.4 mm) for convenience.

Simply stated, the axial offset for tack heads 110 is:

$$\text{axial offset} = \text{one-thirtieth} \doteq 0.0333 \quad (8)$$

Consequently, according to equation (7), for adjacent tack heads 110, $$\text{fractional surface area overlap} \doteq 1-\delta = 0.966 \quad (9)$$

Pause can be taken now to summarize the significance of the new stacking density of tacks 104 in a stack 106 which can be served for ejection by tack magazine 100. Previously, commonly-owned patent U.S. Pat. No. 5,927,922 illustrated a procession of like tacks where density is better illustrated by FIG. 7*a* thereof, and fairly drawn to scale. The fractional axial offset between adjacent tacks is according to equation (5) is about one minus seven-elevenths, or 0.3636 . . . . And then also, commonly-owned patent U.S. Pat. No. 7,228,9982 illustrated a procession of like tacks where density is better illustrated by FIG. 12 thereof, and fairly drawn to scale. The fractional axial offset between adjacent tacks is according to equation (3) is about one minus three-fifths, or 0.40.

Table 2 shows better how this project has evolved, and reversed directions, trending originally to wide and wider tack head 110 spacings, to the present, representing as tightly-packed overlap as the thickness of the tack shank 112 will allow.

TABLE 2

| Project Identifier | axial offset, δ |
|---|---|
| U.S. Pat. No. 5,927,922 (FIG. 7a) | 0.3636 . . . (12/33$^{rds}$) |
| U.S. Pat. No. 7,228,998 (FIG. 12) | 0.400 . . . (12/30$^{ths}$) |
| The present stack 106 | 0.0333 . . . (1/30$^{th}$) |

Hence the nail gun magazine 100 in accordance with the invention advantageously handles the loading and feeding of tacks in about a twelve-fold closer packing than the commonly-owned prior projects.

It is preferred if the pitch of the stack 106 is at least 12° (twelve degrees, and not shown). This means that the stack 106 would extend more nearly like a low ramp than it does now, as a 45° ramp. However, some large-headed fasteners have large shank diameters and relative thin head thicknesses. One common broad-headed fastener has a shank-diameter to head-thickness ratio of 4:1 (four to one). If such a common broad-headed fastener were modified to stack (to date, it is not know to have ever been modified so), then the steepest that such fastener could stack would be $\tan^{-1}$ (¼), which is 14° (ie., the arctangent of the ratio of, the rise the fastener's head, to the axial offset of the fastener's shank). The preference for at least 12° is just tolerance for less than ideal stacking.

It is preferred if the stacking density in terms of number of fasteners per fastener head diameter is at least eight (8). The common broad-headed fastener referred to above, were modified to stack (to date, it is not know to have ever been modified so), then the densest it would stack would nine fastener heads high for every fastener head diameter. The preference for at least eight (8) is just tolerance for less than ideal stacking.

It is preferred if the mean axial offset is at most a third (⅓$^{rd}$). The common broad-headed fastener referred to above would yield this axial offset value if a slot were opened in its head all the way to its shank (not known to date to have ever been modified so). The head diameter of that fastener is only three times (3×) greater than its shank diameter.

It is preferred if the mean surface area overlap between adjacent fastener heads (and of the mean geometry of the fastener heads, ie., excluding slots or the like) is at least 40%. As shown by Table 1, that means that a round fastener head must have something in the nature of a slot into its mean geometry to allow for a lower axial offset value than is possible for a solid fastener head alone. It is more preferred still if the mean surface area overlap between adjacent fastener heads is at least 58%. This corresponds for the high value for the preferred range of mean axial offset.

Figure 8:
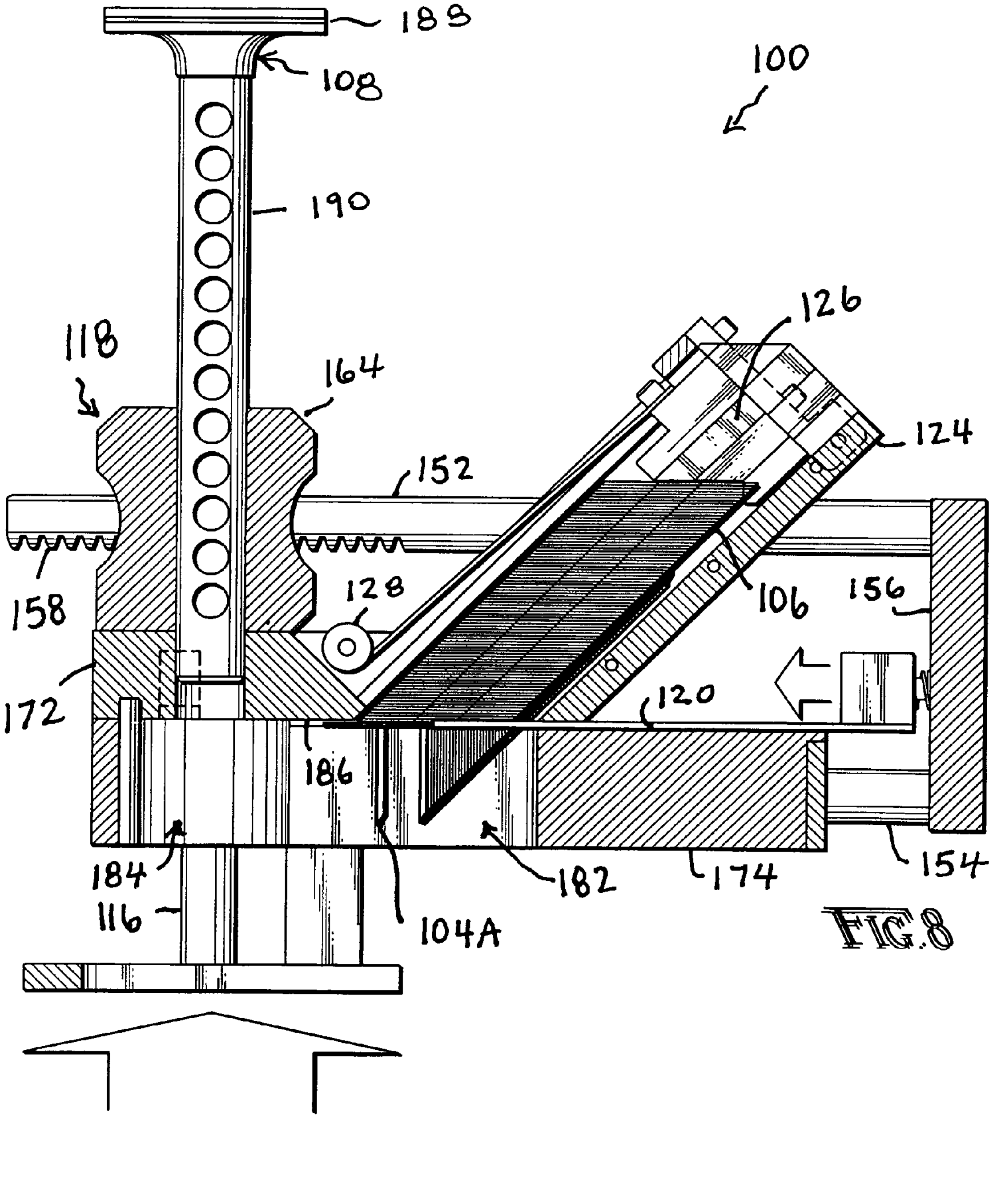
FIG. 8 is a partial sectional view comparable to FIG. 7 except showing the leading member of stack recently separated from the stack and in the process of being fed to the discharge position.

As a preliminary matter, FIG. 8 (among others) allows introduction to a basic aspect of the nail gun magazine 100. That is, this magazine 100 can be reckoned as a mechanism, and one which has three fundamental operatives, namely, (i)

at least one drive axle 116, (ii) an axially-translating hub 118, and, (iii) a transversely-translating slide 120.

As will be more particularly described below, the term "hub" refers to a much more elaborate construction than is ordinarily thought of by use of the term hub.

Figure 11:
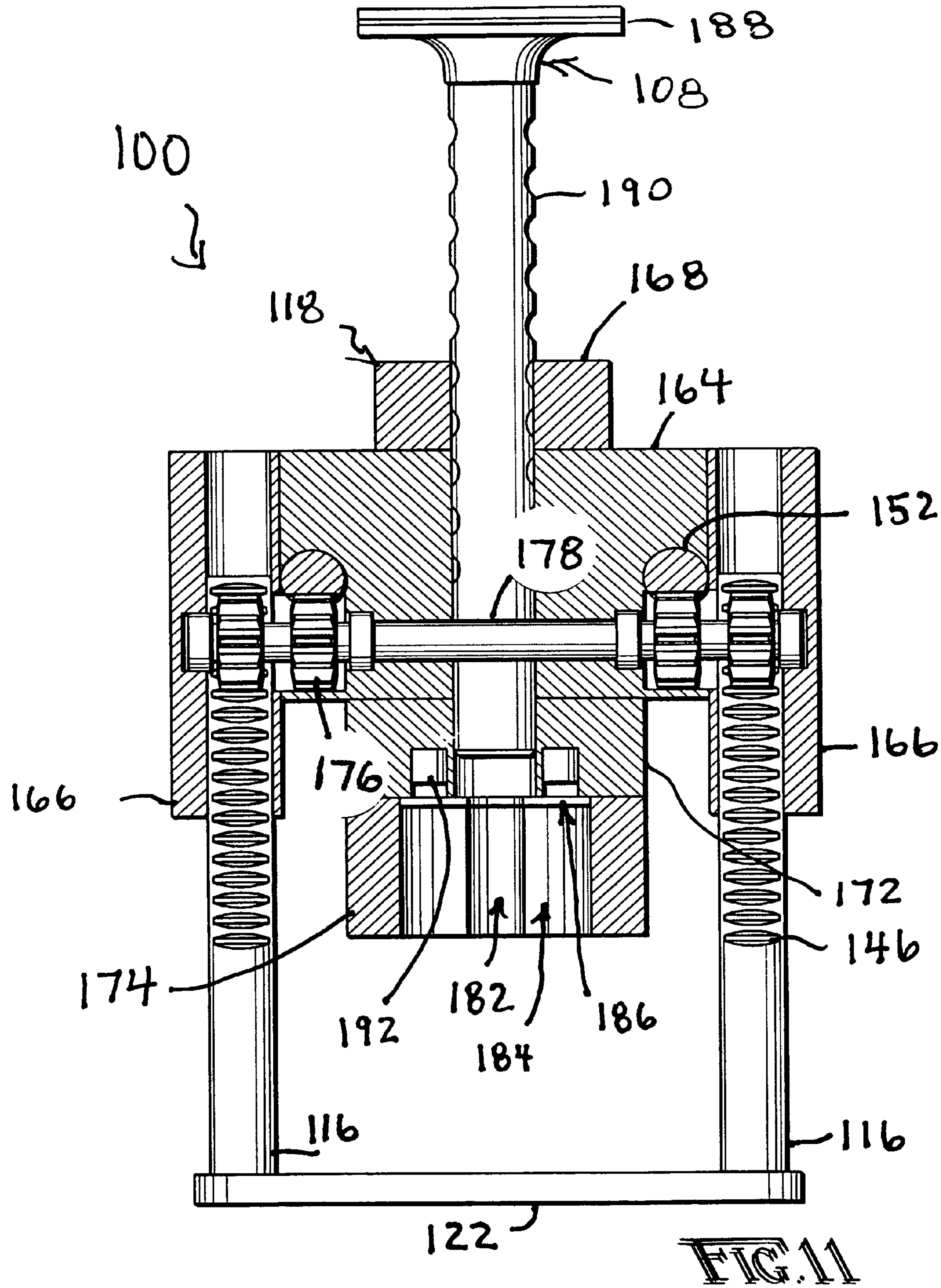
FIG. 11 is a partial sectional view taken through two different vertical planes that are parallel to each other, namely, a foreground plane through the central axes of the drive axles 116 (albeit the drive axles 116, the pinions 176 and the arbor 178 are shown in solid lines), and a background plane through the central axis of the piston shaft 190 (it too being shown in solid line); wherein the top of the magazine chamber in depth behind the background plane is removed from view.

With reference to FIG. 11, in a preferred embodiment of the invention, there is not one but two drive axles 116. They work in unison with each other. The drive axles 116 are connected by a common work-contacting element, namely, a U-shaped shoe 122 (see, eg., FIG. 1).

Returning to FIG. 8, the function of the drive axles 116 is like a reverse plunger. In use, the drive axles 116's shoe 122 is set upon or against a work (none of the drawings show a 'work'). Then the gun 102 (see FIG. 1 or 4) is pushed into the work. The shoe 122 and drive axles 116 actually remain stationary. Conversely, the hub 118 actually does the job of traveling, and it does so by closing the gap between itself and the work. So, this would be like taking a T-handled dynamite detonator, stationing the T-handled plunger against something solid (eg., like the ground) and plunging the detonator body on the (stationary) T-handled plunger.

The drive axles 116 facilitate a linear drive or input stroke (albeit, the hub 118 does the traveling, not the drive axles 116). This causes a linear reaction stroke in the tack-loading slide 120. From the hub 118's frame of reference, the tack-loading slide 120 and the drive axles 116 cycle through linear load and release strokes relative to it. So, among other functions of the hub 118, it provides for the 90° translation between the stroke(s) of the drive axles 116 and the stroke of the tack-loading slide 120.

The foregoing will be more particularly described below, following the discussion that follows of FIGS. 4 through 10 in connection with the hub 118's magazine chamber 124 and the manner of loading it with a stack 106 of tacks.

Figure 5:
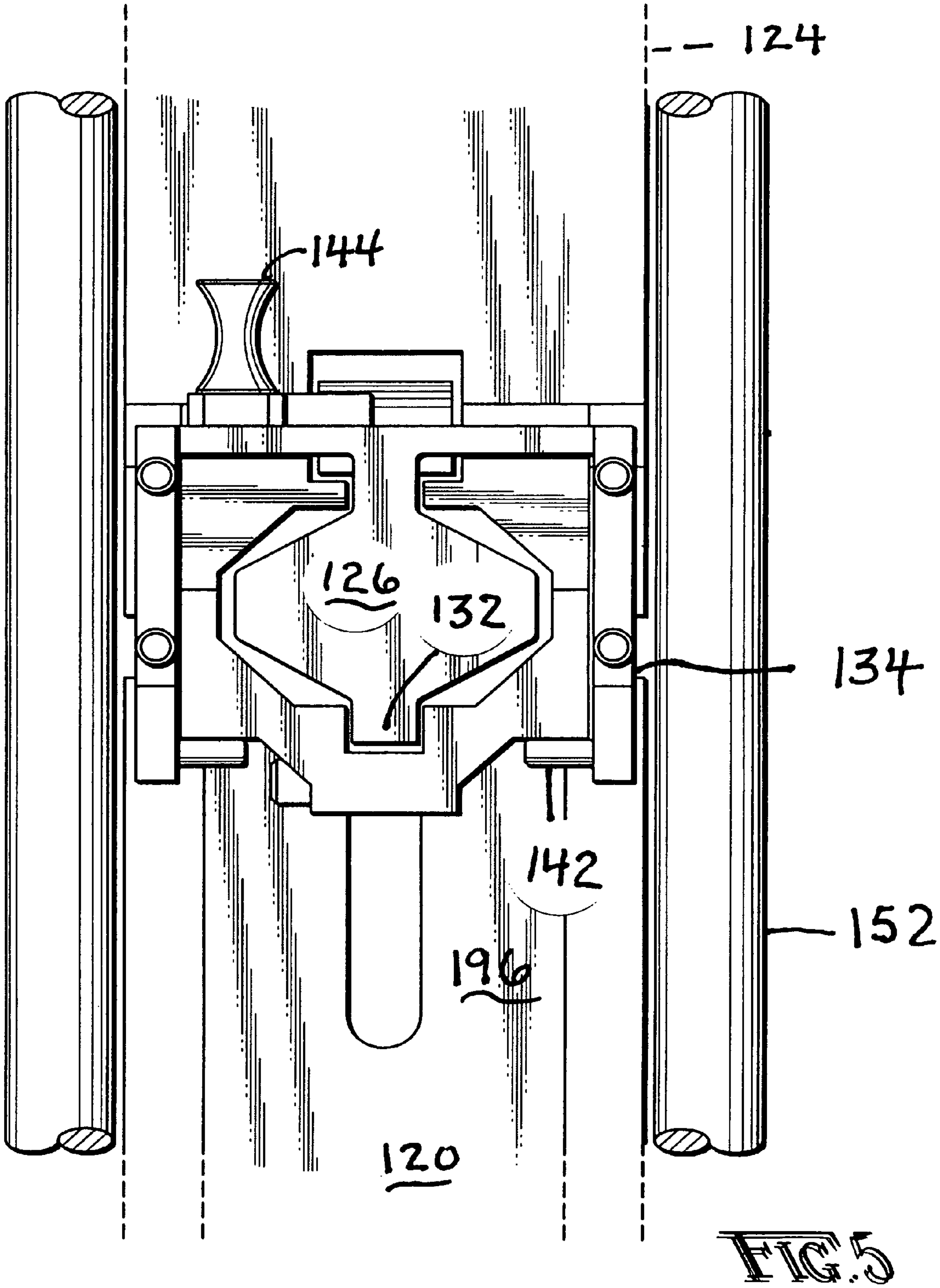
FIG. 5 is an enlarged scale view in the direction of arrows V-V in FIG. 4.
Figure 6:
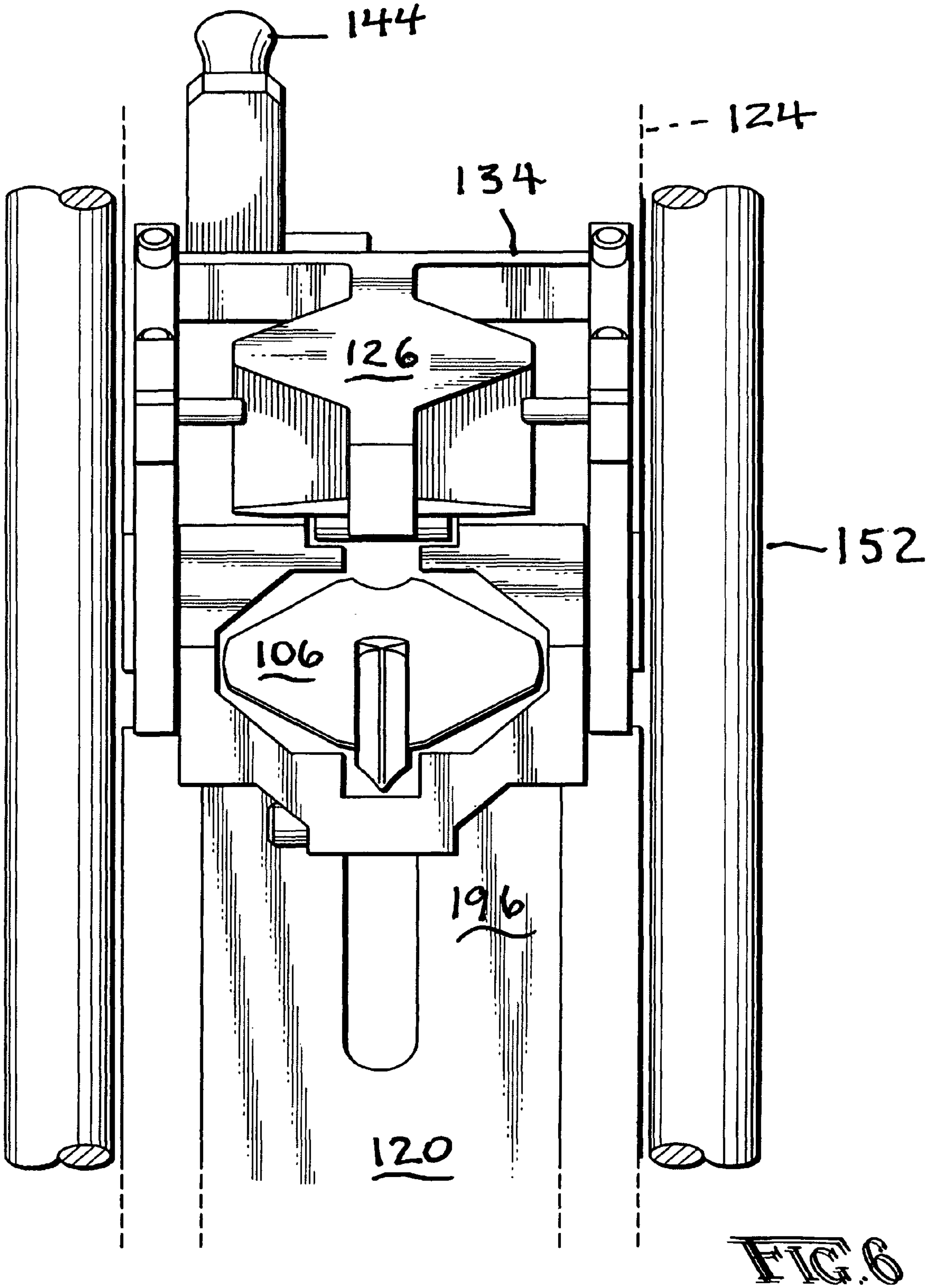
FIG. 6 is a view comparable to FIG. 5 except showing the follower withdrawn and pivoted out of the magazine chamber.

The magazine chamber 124 comprises an open channel oriented at a 45° angle relative to the linear stroke of slide 120. FIGS. 7-10 afford a clearer view of the magazine chamber 124 because it is partly obscured in FIG. 4 by a side dust cover (which is why in FIG. 4 the magazine chamber 124 is mostly illustrated by hidden lines). FIGS. 5 and 6 show that the magazine chamber 124 has a hollow core resembling in cross-section a squashed-octagon, with an open slot in the top wall and a closed slot in the bottom. FIG. 6 shows the magazine chamber 124 loaded with the stack 106 of tacks. Their tip ends travel in the closed slot at the bottom. The hollow core's squashed octagon shape matches fairly well with the octagon shape of the tack heads 110 tilted at a 45° angle. It is advantageous to produce the magazine chamber 124 out of plastic material such as and without limitation DELRIN® or the like, which would help promote free sliding of the stack 106 in the hollow core.

FIGS. 5-10 show better that the magazine chamber 124's hollow core accepts a follower 126. FIGS. 7-10 show better that the follower 126 is tethered by a negator 128 (ie., a constant pressure coil spring) in order to constantly urge the stack 106 such that the lead tack 104A descends into the position where it is separated from the stack 106.

FIG. 5 shows that the follower 126 has a center body with a squashed octagon cross-sectional outline much like the magazine chamber 124's hollow core. The follower 126's bottom contour features a tracking fin 132 which rides in the closed slot. FIGS. 7-10 show that the follower 126 has a tack head-contacting surface that is level with the horizon or, more particularly, parallel with the plane of the head 110 of the top tack 104Z (indicated in FIG. 3) of the stack 106. The tracking fin 132 has a nose end that projects downwardly a little bit, so much so that it enters the slots of about the top three or so tacks.

FIG. 5 shows that the follower 126 is carried by an inverted-U shaped guide sleeve 134. The guide sleeve 134 telescopes over and drapes closely around the outside of the magazine chamber 124. The guide sleeve 134 slides freely up and down on the magazine chamber 124. The follower 126 is connected to the guide sleeve 134 by a crown ridge extending off the follower 126's center body. The follower 126's crown ridge travels in the magazine chamber 124's open (upper) slot (or channel). FIGS. 4 and 5 taken together show that the guide sleeve 134 for the follower 126 has a pair of elongated arms. FIG. 4 shows that the magazine chamber 124's outside lateral surfaces are recessed in with inverted-J shaped tracks 136. FIG. 4 also shows that the guide sleeve 134's elongated arms are equipped with two spaced guide studs 138 on each arm that travel in the inverted-J shaped tracks 136 of the magazine chamber 124's outside lateral surfaces. FIGS. 4 and 5 taken together show that the guide sleeve 134's arms further include a trailing guide pin 142 on each arm.

Optionally the follower 126 and the guide sleeve 134 therefor are produced out of aluminum and, optionally in contrast to the guide studs 138 and pins 142, which might be produced out of stainless or tool steel. FIG. 4 depicts the guide sleeve 134 (and follower 126 carried thereby) in two positions, an extreme advanced position in hidden lines (see also FIG. 5), and an extreme retracted (and swung up) position in dot-dot-dash lines (see also FIG. 6). The guide studs 138 in particular confine the path of the follower 126 to that imposed by the inverted-J shaped tracks 136. Even the follower 126's swung up open position is guided by the guide studs 138 tracking in the tracks 136 for them. FIG. 5 taken together with FIG. 4 shows that the guide pins 142 provide further confinement of the path of the follower 126 once the follower 126 is re-admitted into the magazine chamber 124's hollow core. The guide pins 142 bracket the magazine chamber 124's outside bottom corners.

The guide sleeve 134 has a pull knob 144 on its top. In use, a user might be holding the nail gun 102 in the manner of a pistol and then, simply loop the pinky finger of his or her free hand around the pull knob 144, retract the follower 126 out of the magazine chamber 124 and swing it to the swung up open position. That opens the back or breech of the magazine chamber 124. The user then inserts the stack 106 of tacks as shown and re-admits the follower 126 onto the top of the stack 106, after which the negator 128 (ie., the constant pressure coil spring) supplies the constant urging force that the follower 126 applies against the top of the stack 106.

As mentioned above in connection with FIG. 8, the nail gun magazine 100 can be reckoned as a mechanism that has three fundamental operatives: —(i) at least one drive axle 116, (ii) the axially-translating hub 118, and, (iii) the transversely-translating slide 120. From the frame of reference of the hub 118, it facilitates the 90° translation between the stroke(s) of the drive axles 116 and the stroke of tack-loading slide 120.

Figure 12:
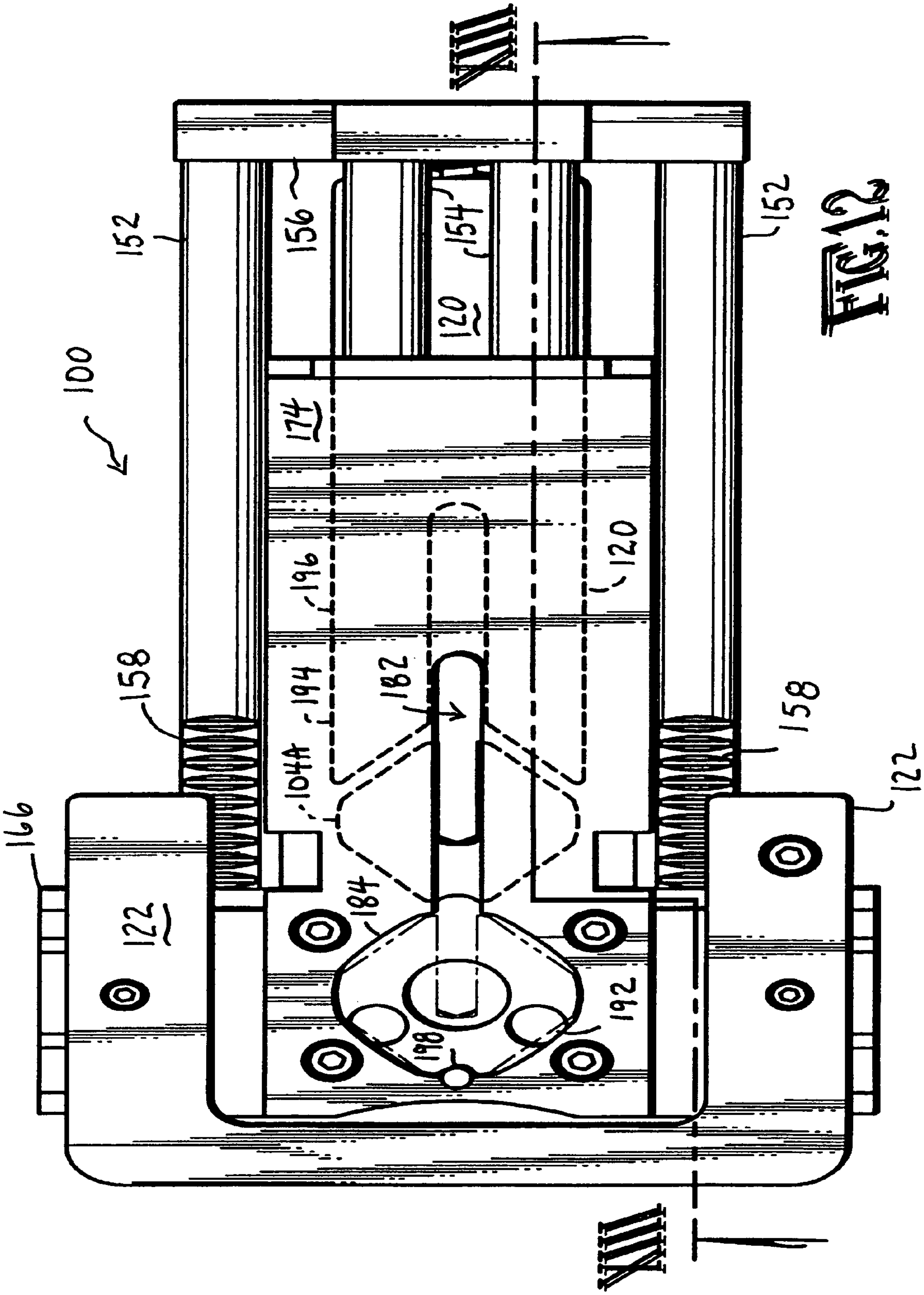
FIG. 12 is an enlarged scale bottom plan view of FIG. 4.
Figure 13:
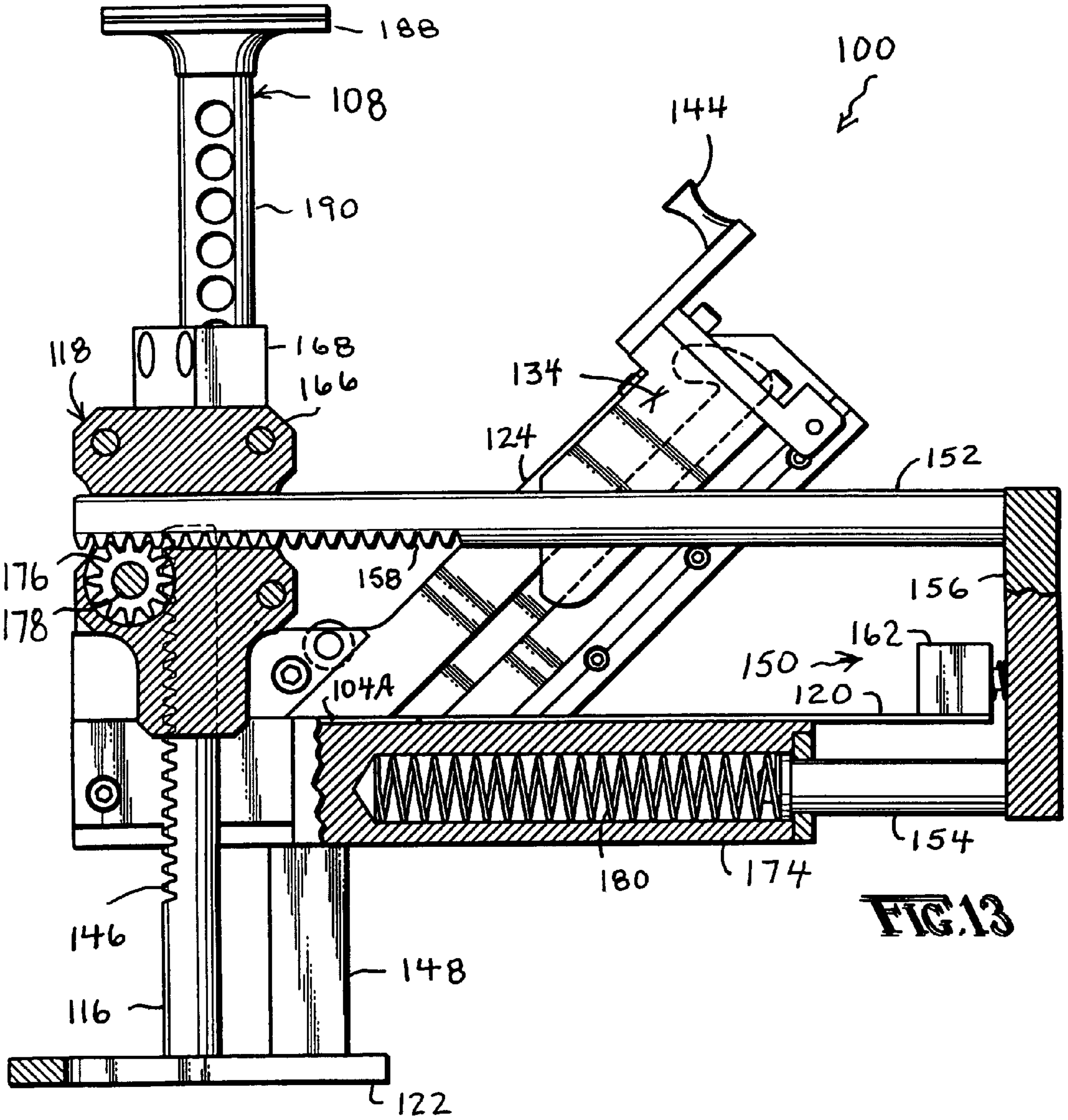
FIG. 13 is a partial sectional view taken along the offset line XIII-XIII in FIG. 12.

FIGS. 11 through 13 show better how this is accomplished. Briefly, it is accomplished by racks and coupled pinions. However, pause will be taken now to identify the structure that facilitates the operativeness of the drive axles 116, hub 118 and slide 120 before how they operate will be described.

The drive axles 116 comprise a spaced pair of parallel rods affixed at one end to and projecting away from the U-shaped shoe 122. The drive axles 116 have gear formations 146 in the nature of rack teeth formed in them for most of their length. The drive axles 116 and shoe 122 are preferably produced of aluminum. As an aside, FIG. 13 depicts a socket 148 for a linkage which replaces the function of the stock safety trip (the safety linkage is not shown, only the socket 148). That is, this is a custom modification to replace the PASLODE® stock safety trip, described above in the Background section. Whereas the PASLODE® stock safety trip only had a very minimal stroke (~¼ inch or ~six mm), the custom linkage serving in place thereof has a stroke of 1⅜ths inches (~thirty-five mm). Hence the majority of the custom safety linkage's travel produces no effect until its last little bit where it contacts the switch that the stock safety trip originally did.

FIG. 11 (among others) shows that the drive axles 116 constitute (needless to say and not counting the custom safety linkage, which is not shown in this view) two sliding members.

FIG. 12 shows better that the tack-loading slide 120 is a part of a shuttling frame 150 which, in contrast to the drive axles 116, comprises five sliding members.

Namely, these five are: —a spaced pair of parallel reaction rods 152; a spaced pair of parallel compression rods 154; and a strip of flat sheet metal stock that serves as the tack-loading slide 120. All five of these members are mounted spaced apart at their rear (base) ends to a base block 156. The reaction rods 152 are formed with gear formations 158 in the nature of rack teeth as shown for about the forward half of their lengths. Preferably the reaction and compression rods 152 and 154 are produced of aluminum; the tack-loading slide 120, spring steel; and the base block 156, DELRIN® or the like.

FIG. 13 shows that the reaction and compression rods 152 and 154 are directly mounted to the base block 156. However, the tack-loading slide 120 is not. Indeed it is connected to the base block 156 by a shock absorber 162 for purposes more particularly described below.

Continuing in FIG. 13, the hub 118 (as mentioned before) is rather elaborate. It has a blocky L-shape, and indeed comprises a construction of several blocks. In addition, the hub 118 carries the magazine chamber 124 along with it, the magazine chamber 124 being affixed in about the vertex of the L-shape.

Referring to FIG. 11, the hub 118 comprise a central guide block 164 flanked by left- and right-side, guide-forming blocks 166. The central block 164 has mounted on top of it an adapter block 168 (or provision). The adapter block 168 is the interface between the magazine 100 in accordance with the invention and the nail gun 102 of the prior art (see, eg., FIGS. 1 and 4). Unlike the other blocks, which might be produced of DELRIN® or the like, the adapter block 168 is preferably produced of aluminum. That way, the adapter block 168 provides a firm, strong connection between the gun 102 and magazine 100. The adapter block 168 (or other adaptive design as need be) would be a custom design for each brand and model of suitable nail guns to accomplish a suitable interface therewith.

Situated beneath the central block 164 is a spacer block 172 (as FIG. 11 shows better) and then, beneath it (as FIG. 13 shows better) is an elongated bed 174. FIGS. 11 and 13 show that the central block 164 is formed with a spaced pair of parallel rod passageways for accepting the insertion and reversible travel of the shuttling frame 150's reaction rods 152. Similarly, the side blocks 166 cooperatively provide a spaced pair of parallel rod passageways for accepting the insertion and reversible travel of the drive axles 116. The rack-formed drive axles 116 have a linear stroke relative to the hub 118 that is 90° to the linear reaction stroke of the shuttling frame 150. The travel of all four rack-formed rods and axles 152 and 116 is linked in unison by a left and right set of coupled pinions 176. That is, the left set of coupled pinions 176 link in unison the travel of the rack-formed left-side drive axle 116 to the rack-formed left-side reaction rod 152. The right set of coupled pinions 176 do the same for the rack-formed right-side drive axle 116 and rack-formed right-side reaction rod 152. Moreover, all four pinions 176 rotate as a unit by virtue of being affixed to a common arbor 178. The arbor 178 extends all the way through a bore for it in the central block 164, and is retained by a pair of opposed blind holes for it, one in each of the side blocks 166. The arbor 178 is free to spin on four bearings supporting it.

The bed 174 is formed with several recesses having varying functions. FIG. 13 shows (with FIG. 12 helping for orientation) that the back of the bed 174 has a pair of elongated blind holes in it for accepting compression springs 180, which are retained therein by a back panel. The back panel is bored through in two places to accept the insertion and reversible travel of the shuttling frame 150's pair of compression rods 154. The compression rods 154 abut against disks that abut against the near ends of the compression springs 180.

All of FIGS. 7 through 11 allow discernment of the recesses in the bed 174 through which the lead tack 104A travels on its way to being discharged from the bed 174. The bed 174 has an elongated, narrow vertical slot 182 all the way through its top and bottom surfaces but terminating in a closed end rearward of where the magazine chamber 124 deposits the lead tack 104A in the separation position. This slot 182 comprises a clearance slot for tack shanks 112. Beginning at its closed end, this clearance slot 182 is symmetric about the longitudinal vertical plane of symmetry of the bed 174, and extends forwardly through the bed 174 until opening up into an enlarged bore 184 for the lead tack 104A's discharge. This tack ejection bore 184 extends vertically through the top and bottom surfaces of the bed 174 and has a diameter sized to allow the discharge of a tack head 110 (see FIG. 2) therethrough, with the pointed end of the shank 112 leading.

The bed 174 has a broad shallow slot or channel 186 recessed in its top surface, originating in the tack ejection bore 184, and being as wide as the diameter of the tack ejection bore 184. This broad shallow channel 186 is symmetric about the longitudinal vertical plane of symmetry of the bed 174, and extends rearwardly through the bed 174 all the way through the back end thereof. This broad shallow channel serves as the slideway 186 for the tack-loading slide 120 as well as for the tack head 110 of the lead tack 104A.

The piston 108 has only been sparingly mentioned above. However, this piston 108 is a custom design to replace the stock piston in the nail gun 102 (which requires some disassembly of the nail gun 102 to do). This piston 108's ring 188 preferably matches the same size as the stock piston's, but this piston 108's shaft 190 certainly has a larger diameter, preferably something approaching ½-inch (~twelve mm). It is preferably produced of tool steel. The piston 108's shaft 190 is drilled through with numerous lightening holes to reduce its weight. The shaft 190 terminates in an impact (hammer) surface.

To continue with the piston 108, there is a vertical bore all the way through the central and spacer blocks 164 and 172 which accepts the insertion and reversible travel of the piston 108's shaft 190. This piston shaft bore opens into the center of the tack ejection bore 184 in the bed 174. On a final note, FIGS. 11 and 12 show that the spacer block 172 has recessed in its bottom surface within the periphery of the tack ejection bore 184 a pair of blind holes, press-fitted inside which are a pair of magnets 192.

With the foregoing in mind, the manner of use of the nail gun magazine 100 as well as the synchronized load and release strokes of the drive axles 116 and shuttling frame 150 can now be more particularly described.

FIGS. 7 through 10 comprise a sequence of views showing the separation, feed and discharge of the lead tack 104A from the stack 106.

Figure 7:
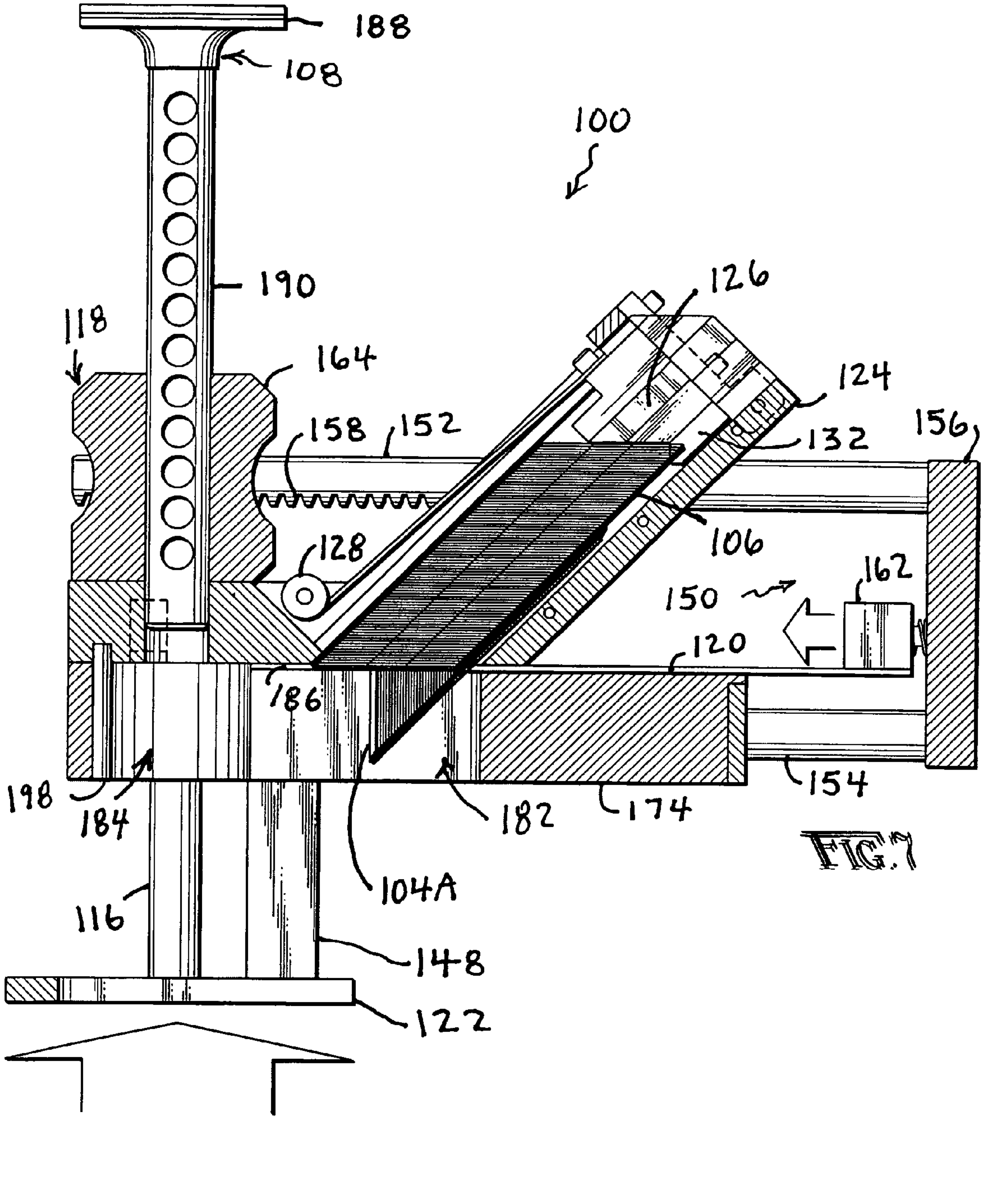
FIG. 7 is a partial sectional view through a longitudinal vertical plane of symmetry of the nail gun magazine, and showing the follower urging the trailing end of the stack in order to supply the leading member to the separation position, wherein the follower's knob is absent from the view since it lies on the missing side of the longitudinal vertical plane of symmetry.

FIG. 7 comprises the first view of the sequence. The drive axles 116's shoe 122 (work-contacting element) has just initiated contact with the work (not shown). The lead tack 104A is stationary in the separation position. That is, its head 110 has just barely descended out of the hollow core of the magazine chamber 124. Its head 110 is resting on the bottom of the slideway 186 for it (the slideway 186 also accommodating the tack-loading slide 120). The lead tack 104A's shank 112 dangles unimpeded for forward travel within the clearance slot 182 for it. FIG. 12 provides another view of the state of things at this stage of the sequence. The tack-loading slide 120 is backed-off at this stage by some gap from the head 110 of the lead tack 104A. This provides some level of assurance that the slide 120, when retracting, retracts fully past where it at least must, and then some. The slide 120 has a forked front end 194 that corresponds to the V-shaped trailing edges of the lead tack 104A. The slide 120 furthermore has an elongated, closed-ended centerline slot extending away from the vertex of the fork to about where shown, and partitioning the leading end of the slide 120 into left and right prongs 196. This slot allows the prongs 196 of the slide 120 to travel alongside and past the suspended shanks 112 of all the other tacks in the stack 106 that suspend down in the slideway 186. FIG. 7 shows better the suspended shanks 112 of numerous tacks 104 in the plane of the slideway 186.

FIG. 8 shows that the hub 118 has traveled, closing the gap to the work by about a quarter or a third of what comprises the load stroke. The drive axles 116's rack formations 146 have spun one pinion of each of the coupled pairs of pinions 176. The other pinions of each of the coupled pairs of pinions have thrust the shuttling frame 150's reaction rods 152 along the linear reaction stroke, at a 90° angle to the drive axles 116.

It is a preference of the invention to utilize racks and coupled pinions as a means of changing straight line motion. However, racks and coupled pinions are not the sole and exclusive means for accomplishing the same, and hence are offered merely as a non-limiting example. Indeed, the reference of D. C. Greenwood, ed., "ENGINEERING DATA FOR PRODUCT DESIGN," McGraw-Hill Book Co., 1961, at pages 324-327, discloses at least eighteen (18) other ways to do so. The foregoing citation is incorporated by reference.

Returning to FIG. 8, the tack-loading slide 120 has slid forward. Its forked front end 194 has not only abutted against the trailing edges of the head 110 of the lead tack 104A but also advanced the lead tack 104A toward the discharge position. The head 110 of the lead tack 104A remains confined the slideway 186 while being pushed from behind. Hence the lead tack 104A has been separated from the stack 106 by being slid out under the bottom. The rest of the stack 106 (for the time being) is propped up by the under-sliding slide 120.

Figure 9:
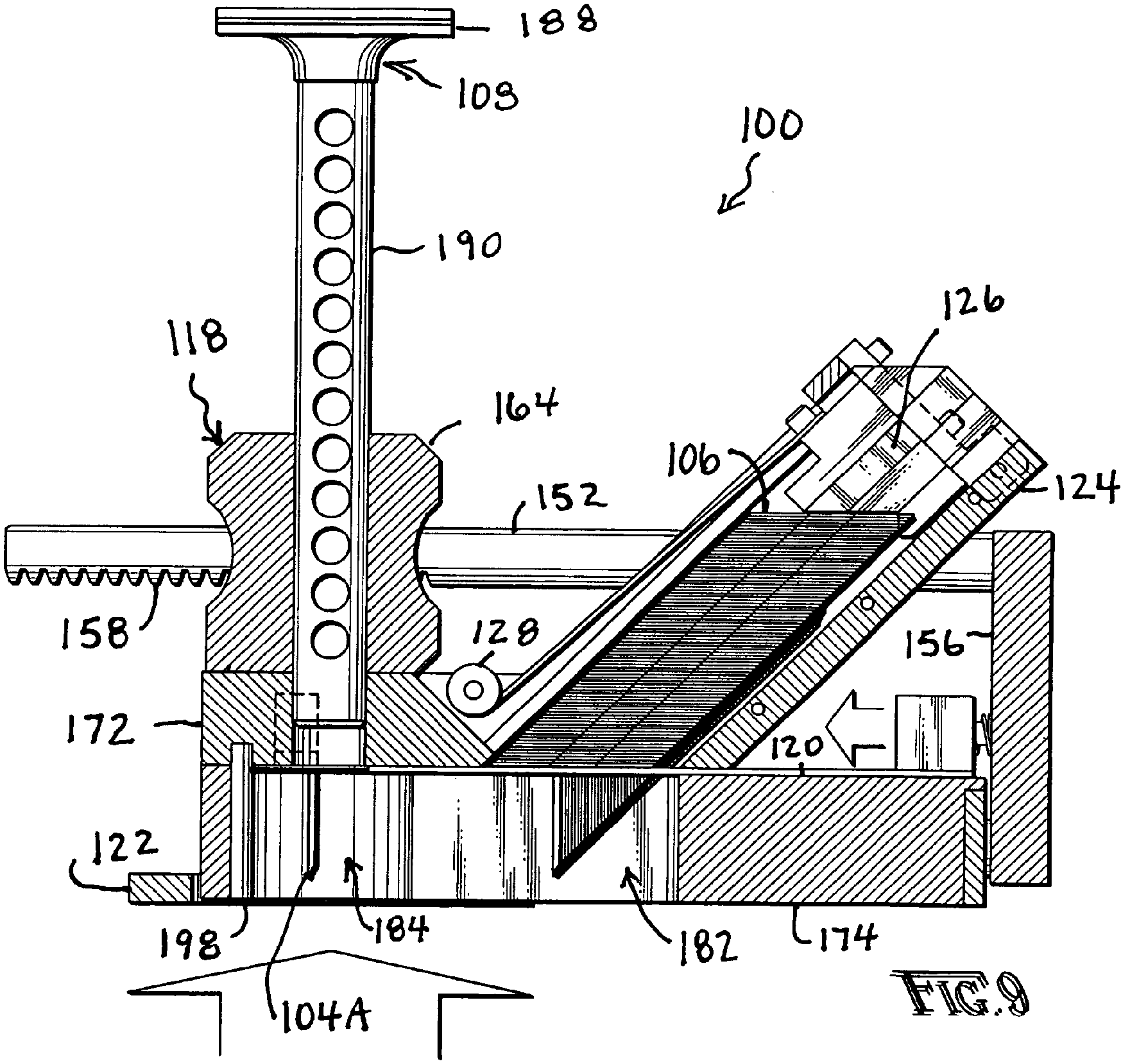
FIG. 9 is a partial sectional view comparable to FIGS. 7 and 8 except showing the completed separation and feed of the lead tack to the discharge position.

FIG. 9 shows that the hub 118 has traveled so far as to close—entirely—the gap to the work. This is the extreme end of the load stroke. The lead tack 104A has been pushed (loaded) into the tack ejection bore 184. The head 110 of the lead tack 104A is retained flush against the bottom of the spacer block 172 by virtue of the magnets 192. As FIG. 12 helps show along with FIG. 9, the tack ejection bore 184 in the bed 174 is furnished with a hard bumper 198 (see FIG. 9) at what would be the foremost travel of the head 110 of the lead tack 104A. Indeed, the hard bumper 198 preferably comprises a short length of tool-steel rod. The hard bumper 198 provides a hard stop for the lead tack 104A when the notch 114 in its head 110 is run against the hard bumper 198. Part of the reason for supplying the slide 120 with a shock absorber 162 is because of the hard stop for the lead tack 104A and slide 120 at the end of the feed stroke. Also, the hard bumper 198 provides wear resistance. At this stage, the lead tack 104A is loaded in the discharge position. All is prepared for the user to pull the trigger on the nail gun 102 and fire the lead tack 104A.

Figure 10:
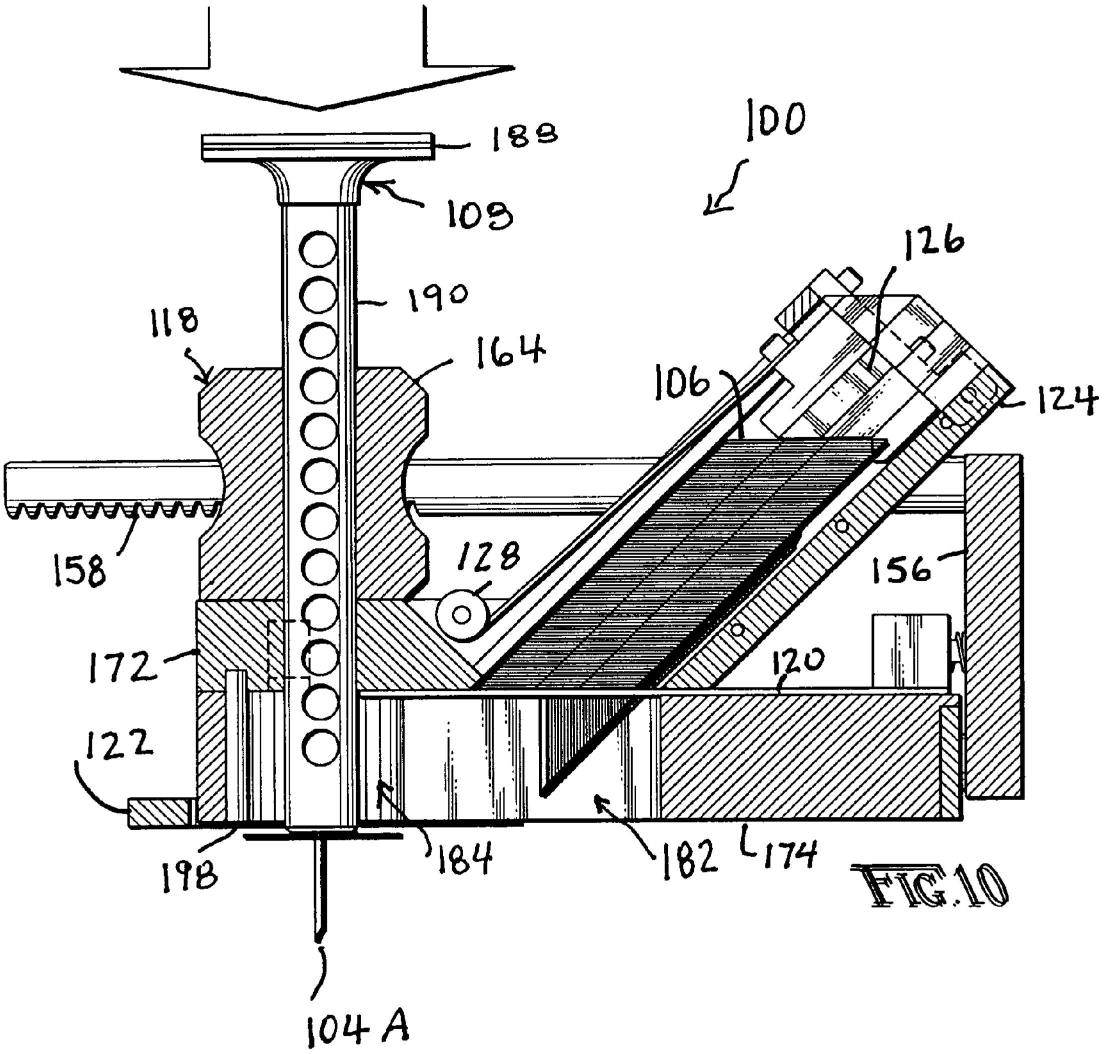
FIG. 10 is a partial sectional view comparable to FIGS. 7 through 9 except showing the lead tack in the process of being discharged.

FIG. 10 shows just that. The nail gun 102 (not in view) has been fired, the piston 108 has been driven such that its lower impact (hammer) surface discharges the lead tack 104A into the work (again, no work is shown).

Henceforth, the discussion shall focus on the release stroke. The load stroke was actually complete by FIG. 9. The release stroke fairly well simulates the load stroke, but in reverse. FIG. 8 taken together with FIG. 13 shows that the load stroke was also driving the compression rods 154 into the compression springs 180, compacting the compression springs 180. When the user lifts the drive axles 116's shoe 122 off the work, the compacted compression springs 180 are the engine which drive the return stroke. FIG. 7 taken together with FIG. 12 shows that the tack-loading slide 120's forked front end 194 has retracted safely behind the next tack 104 to succeed to being the lead tack 104A. As soon as the slide 120's forked front end 194 gives the succeeding tack clearance, its head 110 will descend just barely out of the magazine chamber 124, with its head 110 bottoming out on the slideway 186 for it, but clear to advance down the slideway 186 as soon as pushed from behind by the slide 120.

In short, everything is restored back to an original set position, and in readiness for a succeeding use.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A combination of a portable fastener-driving tool (102) with fasteners (104) and a fastener magazine (100); said combination comprising:

a multiplicity fasteners (104); each comprising an axial shank (112) and a radially expansive head (110); said head (110) having an upper surface, a lower surface, and an angularly circumscribing edge spacing and extending between said upper and lower surfaces; said shank (112) axially depending from said lower surface and axially extending between a conjoined end conjoined with the head (110) and a tip end; said head (110) further being formed with a radial slot extending between an open end in the circumscribing edge and a closed end proximate the conjoined end of the shank (112);

a portable fastener-driving tool (102) having a fastener-driving plunger (108), and a cylinder therefor formed with an axially-extending bore for said plunger (108) to reciprocate between fastener-drive strokes and retraction strokes; and a magazine (100) therefor comprising a stack-of-fasteners feed mechanism and a lead-fastener separating-and-load mechanism;

said stack-of-fasteners feed mechanism comprising a magazine chamber (124) forming an axially-extending chute between an open re-fill end and an open dispensing end, said chute for stacking the multiplicity of the fasteners (104) in such a stack (106) where a lead fastener (104A) has an immediately succeeding fastener (104) bearing down on the lead fastener (104A), and successively to a trailing fastener (104Z), and further wherein the shanks (112) of a plurality of succeeding fasteners (104) extend through the slot in the head (110) of the lead fastener (104A) as well as through the slots in the heads (110) of all preceding fasteners (104), said stack-of-fasteners feed mechanism further comprising a constantly-urged follower (126) bearing down on the trailing fastener (104Z), constantly urging the lead fastener (104A) and every succeeding fastener (104) thereafter through the dispensing end;

said lead-fastener separating-and load mechanism comprising an axially-extending bed (174) formed with a T-shaped slideway (186) axially extending between an intersection with the dispensing end of the chute, comprising a lead-fastener separation station, and an intersection with bore of the plunger (108), comprising an expulsion station; said lead-fastener separating-and-load mechanism further comprising a fastener-loading slide (120) and a drive source therefor for driving said slide (120) in the slideway (186) between a retraction stroke retracted behind the lead fastener (104A) dispensed out of the dispensing end of the chute and situated in the separation station of the slideway (186), and, an fastener-loading stroke engaging the lead fastener (104A) by a portion of the circumscribing edge of the lead fastener (104A) and pushing the lead fastener (104A) to the expulsion station;

whereby the constantly-urged follower (126) pushes constantly bears down on the stack (106) as the slide (120) engages the circumscribing edge of each lead fastener (104A), successively, including through an event when the trailing fastener (104Z) succeeds to becoming the last lead fastener (104A) of the stack (106);

wherein the drive source for said slide (120) comprises a hub (118,172,174), a couple (176), an elongated compression link (116) extending between a work-contacting end and a connection to the couple (176), and, an elongated reaction link (152) coupled to the compression link (116) by the couple (176) such that a compression stroke of the compression link (116) drives the reaction link (152) into a drive stroke;

said reaction link (152) being connected to the slide (120) such that the drive stroke of the reaction link (152) corresponds to driving the slide (120) into the fastener-loading stroke therefor, and whereby during which the lead fastener (104A) is pushed to the expulsion station; and said compression and reaction links (154 and 152) are engaged in the hub (118,172,174) to reciprocate in respective linear strokes, and said couple (176) is configured to translate the linear stroke of the compression link (116) into a respective other linear stroke for the reaction link (152).

2. The combination of claim 1 wherein:

while the slide (120) is pushing the lead fastener (104A) to the expulsion station, the stack (106) is confined by the magazine chamber (124) in the chute thereof such that the succeeding fastener (104) is stationary at the dispensing end thereof as the slide (120) slides underneath thereby, after which the slide (120) retracts behind the succeeding fastener (104), which is then dispensed from the chute and hence accedes to becoming the next lead fastener (104A) in the separation station.

3. The combination of claim 1 wherein:

the compression and reaction links (154 and 152) reciprocate in respective bores therefor in the hub (118,172, 174).

4. The combination of claim 1 wherein:

said couple (176) comprises coupled pinions (176).

5. The combination of claim 1 wherein:

said compression and reaction links (154 and 152) further being coupled together such that the compression link (116)'s stroke opposite to the compression stroke returns the reaction link (152) into a retraction stroke, said reaction link (152) thereby driving the slide (120) into the retraction stroke therefor.

6. A combination of a portable fastener-driving tool (102) with fasteners (104) and a fastener magazine (100); said combination comprising:

a multiplicity fasteners (104); each comprising an axial shank (112) and a radially expansive head (110); said head (110) having an upper surface, a lower surface, and an angularly circumscribing edge spacing and extending between said upper and lower surfaces; said shank (112) axially depending from said lower surface and axially extending between a conjoined end conjoined with the head (110) and a tip end; said head (110) further being formed with a radial slot extending between an open end in the circumscribing edge and a closed end proximate the conjoined end of the shank (112);

a portable fastener-driving tool (102) having a fastener-driving plunger (108), and a cylinder therefor formed with an axially-extending bore for said plunger (108) to reciprocate between fastener-drive strokes and retraction strokes; and a magazine (100) therefor comprising a stack-of-fasteners feed mechanism and a lead-fastener separating-and-load mechanism;

said stack-of-fasteners feed mechanism comprising a magazine chamber (124) forming an axially-extending chute between an open re-fill end and an open dispensing end, said chute for stacking the multiplicity of the fasteners (104) in such a stack (106) where a lead fastener (104A) has an immediately succeeding fastener (104) bearing down on the lead fastener (104A), and successively to a trailing fastener (104Z), and further wherein the shanks (112) of a plurality of succeeding fasteners (104) extend through the slot in the head (110) of the lead fastener (104A) as well as through the slots in the heads (110) of all preceding fasteners (104), said stack-of-fasteners feed mechanism further comprising a constantly-urged follower (126) bearing down on the trailing fastener (104Z), constantly urging the lead fastener (104A) and every succeeding fastener (104) thereafter through the dispensing end;

said lead-fastener separating-and-load mechanism comprising an axially-extending bed (174) formed with a T-shaped slideway (186) axially extending between an intersection with the dispensing end of the chute, comprising a lead-fastener separation station, and an intersection with bore of the plunger (108), comprising an expulsion station; said lead-fastener separating-and-load mechanism further comprising a fastener-loading slide (120) and a drive source therefor for driving said slide (120) in the slideway (186) between a retraction stroke retracted behind the lead fastener (104A) dispensed out of the dispensing end of the chute and situated in the separation station of the slideway (186), and, an fastener-loading stroke engaging the lead fastener (104A) by a portion of the circumscribing edge of the lead fastener (104A) and pushing the lead fastener (104A) to the expulsion station;

whereby the constantly-urged follower (126) pushes constantly bears down on the stack (106) as the slide (120) engages the circumscribing edge of each lead fastener (104A), successively, including through an event when the trailing fastener (104Z) succeeds to becoming the last lead fastener (104A) of the stack (106);

wherein the drive source for said slide (120) comprises a hub (118,172,174), a couple (176), an elongated compression link (116) extending between a work-contacting end and a connection to the couple (176), and, an elongated reaction link (152) coupled to the compression link (116) by the couple (176) such that a compression stroke of the compression link (116) drives the reaction link (152) into a drive stroke;

said reaction link (152) being connected to the slide (120) such that the drive stroke of the reaction link (152) corresponds to driving the slide (120) into the fastener-loading stroke therefor, and whereby during which the lead fastener (104A) is pushed to the expulsion station; and a mechanical bias (180) to bias the compression link (116), in the absence of a compressing force, to a fully extended extreme for the compression link (116), whereby a user can manually supply the compressing force by handling the portable fastener-driving tool (102) to abut the work-contacting end of the compression link (116) against the work, and then manually pushing on the portable fastener-driving tool (102) such that the hub (118,172,174) travels to the work.

7. A combination of a portable fastener-driving tool (102) with fasteners (104) and a fastener magazine (100); said combination comprising:

a multiplicity fasteners (104); each comprising an axial shank (112) and a radially expansive head (110); said head (110) having an upper surface, a lower surface, and an angularly circumscribing edge spacing and extending between said upper and lower surfaces; said shank (112) axially depending from said lower surface and axially extending between a conjoined end conjoined with the head (110) and a tip end; said head (110) further being formed with a radial slot extending between an open end in the circumscribing edge and a closed end proximate the conjoined end of the shank (112);

a portable fastener-driving tool (102) having a fastener-driving plunger (108) that reciprocates between fastener-drive strokes and retraction strokes; and a magazine (100) therefor comprising a stack-of-fasteners feed mechanism and a lead-fastener separating-and-load mechanism;

said stack-of-fasteners feed mechanism comprising a magazine chamber 124 forming an axially-extending chute between an open re-fill end and an open dispensing end, said chute for stacking the multiplicity of the fasteners (104) in such a stack (106) where a lead fastener (104A) has an immediately succeeding fastener (104) bearing down on the lead fastener (104A), and successively to a trailing fastener (104Z), and further wherein the shanks (112) of a plurality of succeeding fasteners (104) extend through the slot in the head (110) of the lead fastener (104A) as well as through the slots in the heads (110) of all preceding fasteners (104), said stack-of-fasteners feed mechanism further comprising a constantly-urged follower (126) bearing down on the trailing fastener (104Z), constantly urging the lead fastener (104A) and every succeeding fastener (104) thereafter through the dispensing end;

said lead-fastener separating-and load mechanism comprising an axially-extending bed (174) formed with a T-shaped slideway (186) axially extending between an intersection with the dispensing end of the chute, comprising a lead-fastener separation station, and an intersection with the fastener-drive stroke of the plunger (108), comprising an expulsion station; said lead-fastener separating-and-load mechanism further comprising a fastener-loading slide (120) and a drive source therefor for driving said slide (120) in the slideway (186) between a retraction stroke retracted behind the lead fastener (104A) dispensed out of the dispensing end of the chute and situated in the separation station of the slideway (186), and, an fastener-loading stroke engaging the lead fastener (104A) by a portion of the circumscribing edge of the lead fastener (104A) and pushing the lead fastener (104A) to the expulsion station;

whereby the constantly-urged follower (126) pushes constantly bears down on the stack (106) as the slide (120) engages the circumscribing edge of each lead fastener (104A), successively, including through an event when the trailing fastener (104Z) succeeds to becoming the last lead fastener (104A) of the stack (106);

wherein the plunger (108) drives the lead fastener (104A) out of the expulsion station along a drive axis;

each one of (A) the lead fastener (104A)'s drive axis, (B) the magazine chamber (124)'s chute and (C) the slide (120)'s stroke are characterized by an elongated axis therefor, all three of which axes are linear and contained in a common plane; and the lead fastener (104A)'s drive axis and the axis of the slide (120)'s stroke intersect at right angles, and, the axis of the magazine chamber (124)'s chute intersects the axis of the slide (120)'s stroke outside of the right angle and at a respective angle to the slide (120)s stroke of between about at least 12° (twelve degrees) and 45° (forty-five degrees).

8. The combination of claim 7 further comprising:

an automatic actuator for the plunger (108) such that the actuation of the plunger (108)'s fastener-drive stroke is timed to coincide with the lead fastener (104A) being pushed into the expulsion station.

9. The combination of claim 7 further comprising:

an actuator for the plunger (108) and a disabling system therefor such that the actuation of the plunger (108)'s fastener-drive stroke is disabled until such time as when the lead fastener (104A) is pushed into the expulsion station.

10. The combination claim 7 wherein:

said portable fastener-driving tool (102) has a cylinder formed with an axially-extending bore for said plunger to reciprocate (108) to reciprocate between the fastener-drive strokes and retraction strokes and each one of (A) the plunger (108)'s stroke, (B) the magazine chamber (124)'s chute and (C) the slide (120)'s stroke are characterized by an elongated axis therefor respectively intersect one another in a common plane and forms—when the combination is oriented to drive a fastener (104) into a vertical wall, with the slide (120) pushing the lead tack vertically up into the expulsion station—an inverted Ł (inverted Latin Capital L with a stroke, or inverted UniCode character U+0141) shape.

11. The combination of claim 7 wherein:

as long as the multiplicity of fasteners (104) is greater than fifteen fasteners (104), the plurality of succeeding fasteners (104) which have the shanks (112) thereof extend through the slot in the head (110) of the lead fastener (104A) as well as through the slots in the heads (110) of all preceding fasteners (104) comprises about fifteen fasteners (104).

12. The combination of claim 7 wherein:

the magazine chamber (124) is formed such that the chute is linear and rigidly confines the stack (106) of fasteners in an incompressible stack (106), wherein the fasteners (104) are all oriented such that slots are all parallel to one another;

said constantly-urged follower (126) being further configured to include a tracking fin inserted in the slot of the head (110) of the trailing fastener (104Z) and a plurality of the slots of a plurality of directly preceding fasteners (104) below the trailing fastener (104Z).

13. The combination of claim 12 wherein:

said magazine chamber (124) being further configured to give the chute a closed slot in the bottom whereby the tip ends of the stack (106) of fasteners and tracking fin of the follower (126) transit through the closed slot without interference.

14. The combination of claim 7 wherein:

the axially-extending bed (174) comprises the following to give the slideway (186) the T-shape thereof: —a spaced top and bottom wall defining left and right opposed branches and with a slot in the bottom wall defining a perpendicular branch;

wherein the head (110) of the lead fastener (104A) slides in the slideway (186) with some portions of the head (110) sliding in the left branch and other portions of the head (110) sliding in the right branch, along with the shank (112) thereof transiting unimpeded through the perpendicular branch.

15. The combination of claim 14 wherein:

the axially-extending bed (174) is intersected by the dispensing end of the chute of the magazine chamber (124) such that the top wall of the slideway (186) is open, whereby the lower surface of the head (110) of the lead fastener (104A) lands on the bottom wall and can go no lower, albeit with the shank (112) thereof dangling in the perpendicular branch of the slideway (186).

16. The combination of claim 15 wherein:

said constantly-urged follower (126) is further configured to include a tracking fin inserted in the slot of the head (110) of the trailing fastener (104Z) and a plurality of the slots of a plurality of directly preceding fasteners (104) below the trailing fastener (104Z);

wherein said the tracking fin can descend lower than the top wall and then the bottom wall of the slideway (186), as well as part way into the perpendicular branch thereof, but no other part of the constantly-urged follower (126) can enter and/or block the slideway (186).

17. The combination of claim 7 wherein:

wherein the slide (120) has a forked front end comprising left and right prongs flanking a non-interference slot for avoiding the shanks (112) of the plurality of fasteners (104) succeeding the lead fastener (104A).

* * * * *